Nov. 17, 1931.  F. C. CLOSE  1,832,531
SIMULATION OF NATURAL SURFACES BY TRANSFER TO CERTAIN MATERIALS
Filed March 11, 1931
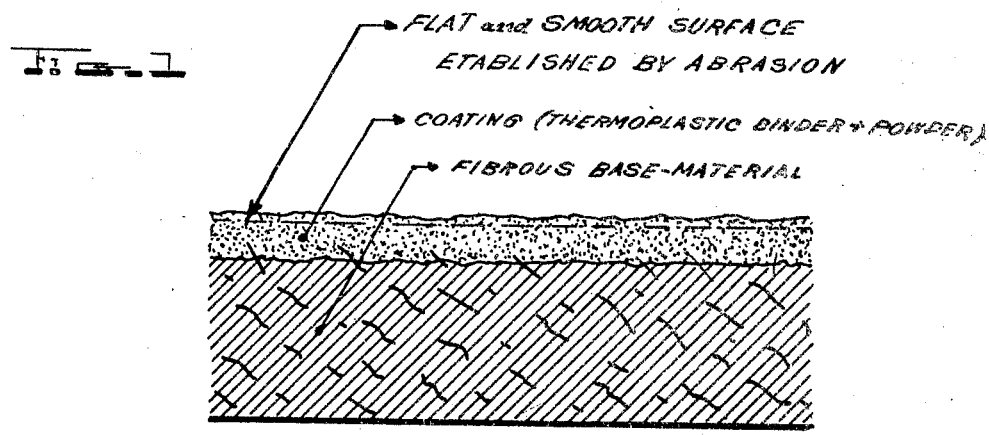
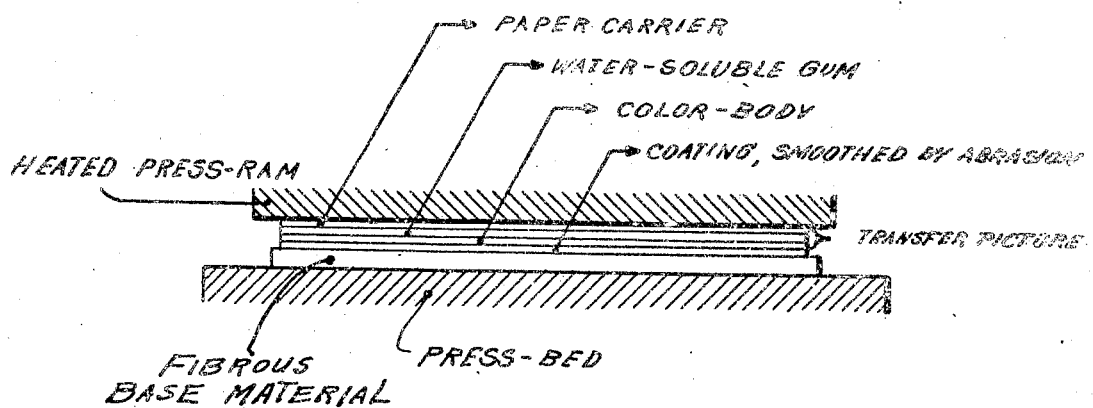
INVENTOR.
Ford C. Close,
BY
ATTORNEY.

Patented Nov. 17, 1931

1,832,531

UNITED STATES PATENT OFFICE

FORD C. CLOSE, OF NEW YORK, N. Y.

SIMULATION OF NATURAL SURFACES BY TRANSFER TO CERTAIN MATERIALS

Application filed March 11, 1931. Serial No. 521,878.

This invention relates to so called decalcomania or the process of transferring a previously printed or otherwise formed picture, from the sheet of paper or other temporary carrier on which the picture is originally formed in any suitable or desired way, to a selected base material, such base material subsequently to constitute the final and permanent carrier of said picture to provide an imitation of the genuine material the surface of which is reproduced or simulated by said picture.

One important object of the invention is to solve a serious problem existing heretofore, that of satisfactorily transferring such pictures to certain base materials which due to their physical structure or otherwise are non-smooth and difficultly smoothable or otherwise have characteristic surface defects of such a nature as to hamper or prevent permanent adhesion of the transferred picture thereto and/or substantially uniform adhesion of such picture substantially all over the base material. A good many base materials of the kind just indicated have been encountered, as natural or fabricated sheets, slabs or other forms; among which, to refer to a few of those I have successfully operated on pursuant to the invention, may be mentioned pulp or fibre board, wall-board or the like including lime or gypsum and fibrous material, and fibre-cement sheetings such as so-called asbestos-cement.

According to the present invention the object above stated is attained, that is, a permanent and uniform adhesion of the transferred picture to a base material falling in the general class above indicated is secured, preferably, by employing a thermoplastic medium or media and at the same time employing heat temporarily to plasticize such medium or media while employing pressure to squeeze the transfer picture and the base material toward intimate surface contact all over; thereby, and by the aid of the thermoplastic medium or media, permanently to bond the transfer picture and the base material together, all over the facing surfaces of the transfer picture and the base material and without wrinkling of the former regardless of the original roughness of finish of the latter. By a thermoplastic material is meant one which under heat and/or pressure becomes temporarily resoftened or restored to a tackiness such that as a result thereof, and as a result of the picture remaining in intimate contact all over with the base material until the thermoplastic material becomes again hardened or dried to the state in which it was preparatory to the transfer step, the permanent adhesion of the picture to the base material is accomplished. From the standpoint of commercial operation, some heat and pressure mode of transfer is an outstanding desideratum; as it not only gives ideal results in the finished product, but offers the practical advantages of permitting the pictures to be prepared, and the base material to be prepared or pretreated pursuant to the invention, at even remotely separated plants, and of permitting the transfer to be accomplished at any subsequent time, and at any place desired, with comparatively inexpensive equipment and small labor cost, and with better results than any other transfer method where the transfer pictures are replicas of large wood panels or marble slabs or otherwise of extensive area.

According to the invention, as already stated, a suitable and preferably a thermoplastic medium or media on a base material of the kind described is employed. This medium or media is applied as a material coated on said base material to act both as a smoothing agent and as a means to facilitate an intimate contact between the transfer picture and the coated base material over the entire area being decorated by the transfer, as well also, when thermoplastic, as to act as an adhesive agent assisting in the final attainment of a uniform bond between the transfer picture and the base material and to provide a general or backing or "ground" coloration of a desired shade or tint, to show through such transparent or translucent portions of the transfer picture as are present, and create whenever desired shading-off effects heretofore deemed impossible in transfer work (so important, for instance, in fabricating imitation marble of absolute fidelity to nature), thereby to assist in the final creating of the general visual ensemble ultimately desired.

Further, pursuant to the invention, a base material in the general class hereinabove indicated, is treated or prepared in such manner that a suitably colored, as for instance a substantially white and opaque receiving surface or integument may be provided on the base material for the transferred picture, with such surface integument or layer, preferably, thermoplastic as aforesaid and present as a permanently carried layer on or interpenetrative entity relative to, the base material and actually substantially integral or unitary therewith because tightly bonded thereto; and all this incidental to imparting to the base material a transfer surface which may be mechanically smoothed to a greater smoothness than that of the base material in its ordinary state. Such a substantially white and opaque transfer surface, especially, is often highly advantageous. Very many of the base materials of the kind with which the present invention concerns itself are of mottled or of dull or drab and unattractive coloration; and it is at present undesirable from the standpoint of technique, and always undesirable from the standpoint of expense, to incorporate a substantially white and opaque coating or stratum in or on the transfer picture itself.

The material which is to act at the same time as a smoothing agent should contain a proportion of dry triturated material or a fine powder, together with a proportion of a suitable binder, and, desirably also, a vehicle for the binder and a solvent if necessary.

In connection with various binders, the powder or filler may be white lead and zinc white and French chalk, ground to about 200-mesh fineness. The powder may be a mixture of any two or all three of the materials just mentioned, or any one thereof; and the powder or powder mixture utilized may run from 5% to 25% of the final or liquid mixture, (binder and/or vehicle) by volume. Cellulose lacquer, when employed as the liquid vehicle, is substantially colorless, and the ground powder or filler, if formed of one or more of the powder materials just mentioned or equivalents and mixed with the liquid vehicle so as to be substantialy uniformly dispersed therethrough when the liquid mixture is applied to the base material, imparts to the subsequently dried layer of said mixture on the treated surface of the base material substantially complete opacity and a full white color. Where said dried layer is desirably to be of some other color than white, the desired tint may readily be predetermined by adding coloring matter as desired, which coloring matter may be additional to the powder above mentioned or may be substituted for said powder as by using a ground pigment; as I have discovered that wide variations in the relative proportions of the binder and the powdered filler or fillers may be indulged in, as hereinabove indicated, while preserving the advantages of the invention.

The accompanying drawings illustrate in Fig. 1, as made plain by the legends thereon, the preliminary preparation of the base material, and illustrate in Fig. 2, as made plain by the legends thereon, the subsequent heat and pressure transfer of the color-body of a transfer picture to the coating of Fig. 1 at the surface of such coating smoothed by abrasion to the fine finish permitted by its powder content.

It is intended that all matter contained in the above description shall be interpreted as illustrative and not in a limiting sense. It is also to be understood that the language contained in the following claims is intended to cover all the generic and specific features of the invention herein described, and all statements of the scope of the invention which, as a matter of language, might be said to fall therebetween. In other words, the scope of protection contemplated is to be taken solely from the appended claims, interpreted, in accordance with the definitions hereinabove expressly or impliedly incorporated, as broadly as is consistent with the prior art.

I claim:

1. The method of imitating natural material on a base of fibrous character, involving applying to the surface thereof a coating of thermoplastic material and having therein a powder content sufficient to harden the coating when cooled and dried so it may be abraded, abrading the surface while cooled and dried to a smooth condition, applying the transfer color body of a previously formed picture to said abraded surface and then applying heat and pressure to cause the color body to unite with the thermoplastic, smoothed and abraded surface to form a smooth surface as set forth.

2. The method defined in claim 1, wherein the powder content of said coating includes a powder component of a selected coloration to have the abraded surface of the coating have a predetermined ground coloration; whereby said ground coloration will show through translucent portions of the transferred color-body.

Signed at Brooklyn, in the county of Kings and State of New York, this 9th day of March, A. D. 1931.

FORD C. CLOSE.